United States Patent [19]

Kuch

[11] Patent Number: 4,878,843
[45] Date of Patent: Nov. 7, 1989

[54] PROCESS AND APPARATUS FOR CONVEYING INFORMATION THROUGH MOTION SEQUENCES

[76] Inventor: Nina J. Kuch, 2197 Dorset St., Shelburne, Vt. 05482

[21] Appl. No.: 203,818

[22] Filed: Jun. 8, 1988

[51] Int. Cl.$^4$ ............................................. G09B 21/00
[52] U.S. Cl. ..................................... 434/112; 352/39; 352/51
[58] Field of Search .................. 434/112, 113; 352/38, 352/39, 50, 51, 52

[56] References Cited

U.S. PATENT DOCUMENTS

| | | | |
|---|---|---|---|
| 3,510,210 | 5/1970 | Haney | 352/50 X |
| 3,809,463 | 5/1974 | Winchell | 352/51 |
| 3,858,333 | 1/1975 | Kopp | 434/156 X |
| 4,414,537 | 11/1983 | Grimes | 434/112 X |

OTHER PUBLICATIONS

"Learning and Using American Sign Language Fingerspelling with the MacIntosh Computer", by Richard L. Smith, Mar., 1985.

*American Cinematographer:* Animated Cartoon Production Today, Part IV: Cleanups and Inbetweening, Jul., 1942, pp. 300–303, 331, 332.

*Primary Examiner*—William H. Grieb

[57] ABSTRACT

The disclosure provides a process and an apparatus for a system of animation and a system of teaching finger spelling.

29 Claims, 6 Drawing Sheets

PROCESS AND APPARATUS FOR CONVEYING INFORMATION THROUGH MOTION SEQUENCES

The disclosure of this patent document, including the drawing, contains material which is subject to copyright protection. The copyright owner has no objection to the facsimile reproduction of anyone of the patent disclosure, as it appears in the Patent and Trademark Office patent files or records, but otherwise reserves all copyright rights whatsoever.

BACKGROUND OF THE INVENTION

1. Field of the Invention This invention relates to a process of communicating to an observer information which can be conveyed in a motion sequence of frames. It includes a method for producing such motion sequences. Particular embodiments of this process are: (i) the process of communicating with deaf persons by means of finger spelling, (ii) the process of teaching such finger spelling to adult learners, i.e., linguistically mature students, and (iii) a system of animation for use in a mechanism requiring a restricted number of frames due to limitations in the storage capacity for images or limitations in the rapid access of said images. It includes an apparatus for practicing the process.

2. Art Background of the Invention

The method of delivery to which this process is addressed is especially well suited to subject matter in which key body positions and intermediate positions are to be learned. An example of this is teaching the manual alphabet used by the deaf. Finger spelling is the assemblying of words from standard positions of the fingers of one hand, usually the right hand, each position representing a respective letter of the alphabet. Finger spelling is a subset of "sign language", which consists of standard hand motions and related body motion and facial expression which, taken together, represent grammatical components of sentences. The United States of America has been a leader in "deaf communication" and the American Sign Language [ASL] is the most widely accepted form of sign language used by the deaf community. Another form of sign language in wide use is Signed English. Most of the signs in Signed English are the same as those in ASL, but their sequential order in sentences is the same as in conventional English. Grammatical units such as articles and endings for tenses, adjectives and adverbs are finger spelled.

Finger spelling is a supplement to ASL. Finger spelling provides a means for communicating words for which there exist no ASL signs. Because there are substantial differences between ASL and conventional English, finger spelling is also used to provide nuances of meaning. Finger spelling is also used to clarify regional differences in signs and to replace signs which are erroneous or have been forgotten. Signed English is the most widely used language in schools and by hearing people who communicate with the deaf.

The signs of the American Manual Alphabet, illustrated as seen by the observer, are shown in "The Pocket Dictionary Of Signing" by R. R. Butterworth and M. Flodin, Perigee Books, copyright 1987, pp. 11-12, and in "Talk To The Deaf" by 1. L. Riekehof, Gospel Publishing House, copyright 1963, p. 1; and in U. S. Pat. No. 3,858,333, issued Jan. 7, 1975 to W. Kopp, and in U. S. Pat. No. 4,414,537, issued Nov. 8, 1983 to G. J. Grimes.

Two inferences may be drawn from the above discussion: Like all alphabets, the manual alphabet will be learned by the deaf as children unless the onset of deafness occurs as an adult. Because finger spelling is used in a supplemental way, most finger spelled words are unfamiliar. Practice, therefore, should provide a means for dealing with unfamiliar words.

There is no standard or approved way to teach finger spelling. Two ad hoc stategies are sometimes used. The first is to become familiar with the configurations which small groups of letters form. Children can be taught to finger spell before they learn the letters of the written alphabet. They can learn to recognize the sequence of finger positions for C_A_T and learn to think of a familiar fuzzy animal that laps milk from a saucer. Because this capability is well known, there are strategies for teaching signing which rely on first learning basic configurations of letters and then varying them, e.g., C_A_T, B_A_T, F_A_T. It is apparent that for a person who is born deaf and learns finger spelling at a young age, this method is natural and probably effective. This method is analogous in many ways to the "look and say" method of teaching reading to children who can hear. Eventually some phonics must be learned in order to cope with unfamiliar words.

Persons with already developed linguistic skills can save time and energy in learning finger spelling by the use of a more structured approach which will allow the transfer of these hard earned skills. Such a learner learns the new alphabet and tries to utilize rules of thumb common to his or her first language, such as syllabication, frequencies of letter or word combinations, and grammatical rules. An example of this is the tendency of the hearing finger speller to break a word down into phonetic components, while the deaf finger speller tends to spell a word in its entirety.

Another ad hoc strategy is used in teaching the positions of the fingers of the hand. A resemblance of certain positions of the fingers to the printed form of the respective letters is emphasized. This method has several drawbacks. Fewer than half the finger positions have any resemblance to the respective printed form. Some finger positions look like upper case letters, some look like lower case letters. Most only look like a printed letter when viewed from one particular vantage point. As a learning strategy, the mnemonic value may be outweighed by the emphasis on learning a letter in isolation and the emphasis on its identifying name rather than its sound.

That none of these ad hoc methods really works is indicated by the widely held view, especially among instructors who are deaf, that facial expression and lip reading are a necessary part of finger spelling. The adult is taught to finger spell without obstructing the reader's view of the speller's face. When reading finger spelling, the learner is taught, especially by deaf instructors, not to concentrate on the spelling fingers, but, rather, to watch the facial expression and to read the lips of the speller. The complexity of such a task is overwhelming. The deaf have facial expressions for many words that the hearing are used to delivering "deadpan" such as: scared and plentiful, thick and thin. Lip reading is a skill whose complexity rivals finger spelling. While these kinds of contextual clues may add nuances of meaning for the advanced communicator, they add unnecessary complexity to the task of acquiring at least a minimum of facility in finger spelling.

Advances in technology and in our knowledge of how we mentally process visual information can be used to simplify the learning of finger spelling.

Videotape Systems:

Videotape is frequently used in the teaching of sign language. I know of no use of videotape which is devoted exclusively to finger spelling. Videotape can deliver realistic images in real time, but it is ineffective in teaching finger spelling for the following reasons: (i) The playing mechanism is slow and cumbersome. It is difficult and time consuming to find a particular part of the videotape to play or replay the particular words stored thereat. (ii) It uses predetermined word lists while finger spelling deals primarily with unfamiliar words. (iii) Elements cannot be regrouped. Letters must be viewed in the sequence in which they are stored on the videotape and cannot be used to form new words. (iv) Tho learner has no control over content (subject matter,) context (word order in a sentence,) speed (duration of display of each image,) order (learning style,) or other factors in his or her process of learning.

Computers:

Recently, a computer has been used to display the finger positions for a letter as a small line drawing similar to those diagrams in the front of sign books indicating the letters of the manual alphabet from the receptive view, i.e., as the viewer sees it. Each letter appears when the respective letter key on the keyboard is struck. The effect is that of an automated flip book. The letters of the manual alphabet are small. No three dimensional information is provided. No system for teaching the forming of the letters is provided. No system for visually distinguishing one letter from another is provided. No means is provided of anticipating which letter will next come in the series. No cognizance is taken of the fact that the salient features distinguishing one still image from another still image often substantially differ from the salient features which distinguish moving objects. For example, two airplanes sitting on the ground may be distinguished by their painted decorations, whereas two airplanes at high altitude first would be distinguished by their overall shape and then, if necessary, by a distinguishing visual detail.

The chief disadvantage of the computer per se is the current limitations of its graphic capabilities.

Computer-Peripheral Systems:

The process of this invention is applicable to instructional delivery mechanisms in which "complex images" are made instantly available by the so-called random access capability of computers, or any machine that will simulate that capability. Complex images are photo-like, with a wide color range and grey scale that convey the level of three dimensional information found in a sharp photograph. Videotape images are complex images. However, as discussed above, the videotape player moves too slowly to access images that are not adjacent.

The speed of access of images must permit the illusion that the images are successive with no blanking or flashing of color to interfere with persistence of vision. Although retrieved instantly, the images must be capable of being visible for varying durations of time.

The computer is theoretically capable of meeting all of these criteria. Complex images on the computer often are referred to as raster graphics or bit-map graphics to indicate that the information is not stored in an algorithm and redrawn but as an assemblage of bits which are brought from storage as a unit. Because of the enormous memory capacity required by such images they are usually stored in peripheral devices. Examples of such computer-peripheral systems are: the intelligent videodisc; Compact Disk Interactive [CDI]; and Digital Video Interactive [DVI]. Computer-peripheral systems are a preferred type of delivery system for this invention.

The preferred embodiment of this invention incorporates heuristics, both visual (innate and learned) and cognitive. Learning in visual groups, aided by kinesthetic memory and the knowledge that we know what others see when we move our own hands, are a combination of learned and "prewired" heuristics that will enable students to recognize so many letters that they will actually be reading words. This invention teaches a process for making an image which allows multiple uses of said image. Such images are useful in a self contained system for multiple learning strategies such as this invention contemplates. Such a system allows the user to structure the level of participation in available activities and the order in which to participate in them.

Since the information in a motion sequence (e.g., the bare showing of the expressive manual alphabet,) is not coextensive with the intellectual content of the material (e.g., strategies to make the letters and what their names are,) the invention anticipates the use of ancillary techniques to provide contextual clues such as: overlay of letters or words, sound track information, color or other symbol coding. Kinesthetics, i.e., the memory of muscle movements, also provides the viewer with information about what is being seen. Therefore, the invention also includes activities of the viewer which are read by the computer such as keyboard stroking, voice recognition, and sensing devices for specific actions. To be part of the process, the activity must be directed to enhancing the visual learning task, must refer to a specific set of stored images and a be accessed by a unified set of instructions. All of these capabilities can be accomplished with known computer-periperal systems such as intelligent videodiscs, CDI and DVI.

Conventional Animation Systems:

The characteristics of preferred delivery systems, e.g. computer-peripheral systems, best suited for the processes of this invention result in critical differences between said processes and standard animation practices. There are two main categories of differences, timing and the characteristics of the image.

Timing: Animation can be used as a substitute for real time motion sequences. Real time motion sequences accessed by a computer present the following problems: (i) Parts of the real time sequences may be blurred depending on the speed of the movement. (ii) If the spacing between accessed motion segments is too great, there may be a black flash or other visual blanking. (iii) The access time of the computer may be too slow for the smooth running of the program. (iv) There may be mismatches between the sequences which will produce visual disconuities. These problems are most severe where the individual images contain a great deal of information such as grey scale information in a photograph-like picture.

Conventional animation is virtually two dimensional and utilizes outlines to define areas which may be filled in with essentially flat colors. The outlines convey most of the information, e.g., the contrast between the figures and the background, the shape of the figures, and the movement of the figures. Conventional animation requires perceived smoothness of motion for its simulation of reality. That line is also the key element in producing the illusion of motion is made very clear in a review of conventional animation in "Disney Animation—The Illusion of Life" by Frank Thomas and Ollie Johnson, Abbeville Press, New York, 1981, at p.35: "One day, almost by accident, someone made a series of drawings that looked far better than anything that had been done before. Each drawing had so close a relationship to the other that 'one line would follow through to the next'. . . . - how amazed everyone was that just making the lines flow through each drawing in a series could make such a difference . . . - suddenly there was a pleasing smoothness that led the eye from drawing to drawing."

"Everyone knew that it was necessary to get a feeling of weight in the characters and their props if they were to be convincing . . . , . The animators sensed that the key to the illusion of weight lay in the timing and how far a character moved and how fluid the action was, but it was not until they were able to study live action films that the solution was finally found."

This last sentence is a reference to the use of frame by frame studies of live action simulations of sequences that were to be animated. These could not be traced.

[At page 323] "But whenever we stayed too close to the photostats or directly copied even a tiny piece of human action, the results looked very strange. The moves appeared real enough but the figures lost the illusion of life . . . , . It was not the photographed action of the actor's swelling cheek that mattered, it was the animated cheek in our drawings that had to communicate . . . , . Our job was to make the cartoon figure go through the same movements as the live actor, with the same timing and the same staging, but because animatable shapes called for a difference in proportions, the figure and its model could not do things in exactly the same way."

[At page 65] "There was some confusion among the animators when Walt first asked for more realism and then criticized the result because it was not exaggerated enough. In Walt's mind there was probably no difference."

Perhaps it is the reliance on line for so many functions in conventional animation that causes the same authors to end the discussion of the development of film animation with the following remark [at page 528]: "The field of educational films has an almost unlimited future with very little of its potential explored."

In conventional animation all frames are displayed in succession at a constant velocity, e.g., twenty-four frames per second. Key positions are exagerated so as to be perceived as such. The inbetween positions are not intended to be seen because that would interfere with the perceived smoothness of the motion. Therefore, the burden of information must be conveyed by lines in key frames.

In the present invention a bridging position can have two information conveying functions: It can contribute to the illusion of lifelike motion, and it can presage the information content of the next key frame. Unlike inbetween frames in conventional animation, it can be accessed to function as a bridging frame in more than one sequence, and it can be held for the duration of time for which it is needed to convey information.

Key frames do not have to be exagerated in order to be perceived as such, rather they can show of lifelike positioning of their elements. Differences in durations of time of display can be used to distinguish key frames from bridging frames.

In the case of finger spelling, length of time indicates importance. The letters, i.e., the principal material, should be displayed to the observer for a longer period, which is long enough for all of its information to be perceived and for the observer to realize that it is principal information. The intermediate material should be displayed to the observer for a shorter period, which is merely long enough for its information to be perceived, but short enough for the observer to realize that it is not principal information. The end letter of a word in a sentence can be indicated as such by holding it for an extra increment of time.

Complex Images: A major difference between the images of conventional animation and the images contemplated by this invention is that the latter are complex, i.e., photo-like, and the former are not. The discoveries of differences in how complex images create the illusion of motion as opposed to conventional animation were made on an ad hoc basis. The manipulation of complex images contemplated by this invention may contribute to the body of knowledge about surface information, which is an important concept in machine vision. Therefore, it may be worthwhile to point out the similiarities and differences with the theories of David Marr.

In "Vision" by David Marr, pub. W. H. Freeman, copyright 1982, Marr offers a controversial and incomplete conceptual framework for this invention. As both a neurobiologist and a computer scientist, Marr offers a useful vocabulary and conceptual hierarchy based on his unique vantage point. He postulates three stages of perception. His first or primal stage is based on well known facts that the eye-brain has specific cells for specific functions, i.e., motion detectors, edge and line detectors, orientation detectors (bars), and intensity detectors. Information grouping, whether it is by these detectors alone or in concert with other processors, is the essential first stage in perception.

Marr refers to the initial results of 2-D processing by the retina as the "primal sketch" in which he identifies landmarks such as edges, boundaries, and regions. Marr's concept involves a two stage primal sketch: "raw" and "full". On an ad hoc basis this invention telescopes Marr's more detailed theoretical concept into the basic characteristics already known as the "gestalt" principles of grouping incomplete visual data into conceptual units. On an ad hoc basis, the first filtering of vision is the determination of what is important, e.g., what will move, from that which is unimportant, e.g., what will stay the same. In discussions of human perception this is conventionally refered to as the distinction between "figure" and "ground".

The contribution for which Marr is most well known is the concept of a stage intermediate to the data collection stage and the perception of 3D. This is Marr's "2½-D sketch," which can be loosely understood as "surface information" as used in describing the present invention. Marr particularly emphasizes surfaces that have definite positions and orientations in space.

Marr's background led him to the conclusion that the identification of surfaces occurs early in the retina. The neurons of the retina and the visual cortex employ what Marr calls "modules" which rely on clues such as texture, color, motion, shading, and stereo (an offset of patterns such as one sees by shutting one eye or the other eye.)

Marr offers a conceptual framework for an observable characteristic of what I call "complex images."

Complex images can be observed to operate differently from the line drawings and two dimensional use of color that characterize conventional animation. Texture that moves across a stable background is perceived to be part of an object and helps to define that object as it moves in space. I believe that this optical illusion is stronger than the optical illusion that a moving line represents an outline of a shape moving in space.

The process of this invention utilizes the discovery that when a great deal of surface information is utilized, a greater leeway is available with respect to timing. As represented in the Thomas and Johnston book, mentioned previously, timing to achieve smooth motion was the key discovery in the "Illusion of Life."

Marr's third stage of visual processing is "3-D model representation". This stage of vision processing is the recognition stage, which Marr would admit is not well understood beyond the known facts that knowledge, experience and context (what I call cognitive heuristics ) play important roles. This is the least well developed part of Marr's theory and Marr's background accounts for his tendency to discuss "prewired" heuristics (such as the example discussed above of moving surface texture) in greater detail. The distinction between the two kinds of heuristics is deliberately ignored by me because I probably think much more of vision is learned behavior than Marr would concede. Also the speed at which learned heuristics operate blurs the observer's cognizance of separate stages of vision. Heuristics do play a very important part in the process of learning to finger spell. The ad hoc rules that the learner discovers from the bridging frames which lead him or her to anticipate the next letter operate the same way a prewired gestalt rule would.

BRIEF DESCRIPTION OF THE DRAWING

The present invention will become more fully understood from the detailed description given hereinbelow and the accompanying drawing which are given by way of illustration only, and are not limitative of the present invention and wherein.

DESCRIPTION OF THE INVENTION

DEFINITIONS:

Frame

"Frame" is used in the cinematic sense as a screenful or other assemblage of visual elements all of which are presented to the observer at the same moment of time. Frames can have meaning individually, but usually they are part of a motion sequence, which sequence defines a unit of information.

Principal Frame

"Principal Frame" may be a key in a motion sequence but it is not limited to that function; it can be the end frame of a real time motion sequence which is linked to another frame, e.g., the end of a real time sign sequence linked to a frame which starts a finger spelling sequence.

Visual Bridges or Bridging Frames

"Visual Bridges" are subsets of frames and have two linking functions: (i) They provide contextual information and may presage the next frame. (ii) They provide the illusion of motion between "principal" frames. A visual bridge may consist of one or more "intermediate" frames linking a principal frame to a principal frame.

Complex Images

"Complex Images" are photo-like in that they convey three dimensional information through means such as size, perspective, focus (sharp or fuzzy), and framing, but most importantly, through surface information.

Surface Information

"Surface Information" are descriptions of surfaces such as texture: whether a surface is rough or smooth, close or distant, through means such as: grey scale, color (hue, saturation, value), shadows, highlights, etc. Other examples of surface information are: contour, motion, orientation and stereo (an offset of patterns such as one sees by shutting one eye or the other eye.)

Timing

"Timing" is the number of in-between-positions and the speed of their presentation. The process of this invention utilizes the fact that when a great deal of surface information is involved, a greater leeway is available with respect to timing.

Heuristics "Heuristics" are rules of thumb which are accessible at a conscious level and include both visual and cognitive heuristics.

An example of visual heuristics is that if a pattern moves across another pattern, the moving pattern is perceived as the surface of a rigid object. A circular pattern of widely spaced dots moving across a background of closely spaced dots might be seen as a round piece of paper with polka dots. If the closely spaced dots are visible between the widely spaced dots, then the circular pattern may be interpreted as dots on a circular piece of transparent plastic or glass.

Cognitive heuristics are those about which there is no argument that they are learned. If a letter of the manual alphabet is learned as belonging to a visual category, the moving surface pattern of the hand will be interpreted against a mental template with the salient features of each visual category. In keeping with the principles taught by the present invention, all visual clues will be used for a threshhold reading of whether the relative position of the hand and wrist is upright or rotated, and thereafter whether significant fingers are curled or extended.

In the ongoing development of machine vision it has become very clear that 3D perception depends on heuristics of both kinds. Many innate rules have been identified. Furthermore, it is well known that we continue to see optical illusions even though we may know that they are illusory.

The evidence that seeing is learned behavior is more fragmented, but equally compelling. A famous example is the change in how artists' depictions of what a galloping horse looks like changed after the camera captured the actual positions.

Prewired or learned, the present invention utilizes the fact that anticipation or mindset can be critically important to what we do see.

The method of this invention of teaching finger spelling emphasizes its three dimensional nature. Therefore, heuristics which are outside the movement sequences are nevertheless an important part of the process.

Salient Features

"Salient features" comprise those visual characteristics which act as triggers to the recognition of motion (direction and speed), 3D, and subject matter.

Figure and Ground

The distinction between "figure and ground" in this invention includes the use of visual elements which distinguish edges, boundaries and regions. It includes the cognitive concept of what is important and what is not important.

THE PROCESS AND APPARATUS OF THE INVENTION:

(Step 1) Determine and prepare the visual subject matter according to the primary salient visual feature of the principal frames:

(A) On the basis of cognitive content: This is the kind of determination that might be made by an expert in the field and its purpose is to distinguish important details from distracting details. E.g., if the frame is to be derived from an actual photograph, then camera angles, framing (cropping), and lighting should be organized to emphasize what is important from what is nonessential. Other methods of input can imitate camera input.

In the case of finger spelling, the positions of the fingers relative to the hand must be clearly visible. The fingers must be of maximum screen size vertically, including hand, wrist and an indication of forearm orientation. The location of the hand should be consistent with what would be seen in a larger view with the hand being held so that the lips and facial expression can be read at the same time. The angle of the hand should give the optimum 3-D information about the relative positions of the fingers.

(B) On the basis of visual features: In the example of finger spelling, an angle of presentation is chosen which shows the hand and wrist against a neutral background to emphasize the salient visual features of each letter. Lighting should highlight the finger positions. The most important visual feature is the distinction between figure and ground. This is the visual equivalent of the gross cognitive judgement of what is important and what is not important.

(Step 2) Make a complex image, e.g., scan an image into a computer.

(Step 3) Manipulate the visual features of the principal frames emphasizing the large pattern features, i.e., the gestalt. The elimination of extraneous information in the background and the advantageous positioning of the figure are the primary objectives of this step. E.g., the figure can be altered in size, rotated, translated; the background detail can be blurred or overlaid with color; etc.

In the case of finger spelling, the framing and positioning of the arm leading to the wrist are restricted so that there is a basic consistent shape against a background which will serve as a reference. All positions of the hand are altered to be consistent with this reference.

(Step 4) Prioritize the salient features of the principal frames and divide the material into visual groups based on that priority.

(A) On the basis of visual features: the subject matter can be used to prioritize whether the salient features should emphasize motion or 3D.

(B) On the basis of cognitive content: In the case of finger spelling the most important cognitive considerations are as follows:

Students can be taught what to look for, and taught to see what is looked for.

Kinesthetic skills, i.e., the memory of the pattern which muscles make when they move, can be utilized to learn finger spelling. By relating what a student knows about his or her own kinesthetic skills, namely what the speller's hand looks like to the reader, "expressive" and "receptive" alphabets are perceived to be a single alphabet. Individual differences in how different persons make their letters become insignificant.

The salient features of still and moving images are different and finger spelling should be learned as letters in motion, i.e., with attention to their context in space and time.

Anticipation of subsequent letters based on innate and learned knowledge of gramatical structure can be enhanced by learning visual clues which enable the observer to anticipate which letter is coming next. Visual processing is so fast that, once learned, the observer is barely conscious of these clues, and is free to concentrate on the clues given by the context of the information being communicated.

With reference to the above considerations there is a preferred order of presentation for learning the letters of the manual alphabet to provide the learner with the optimum help from visual and kinesthetic clues. See FIG. 1.

Figure 1:
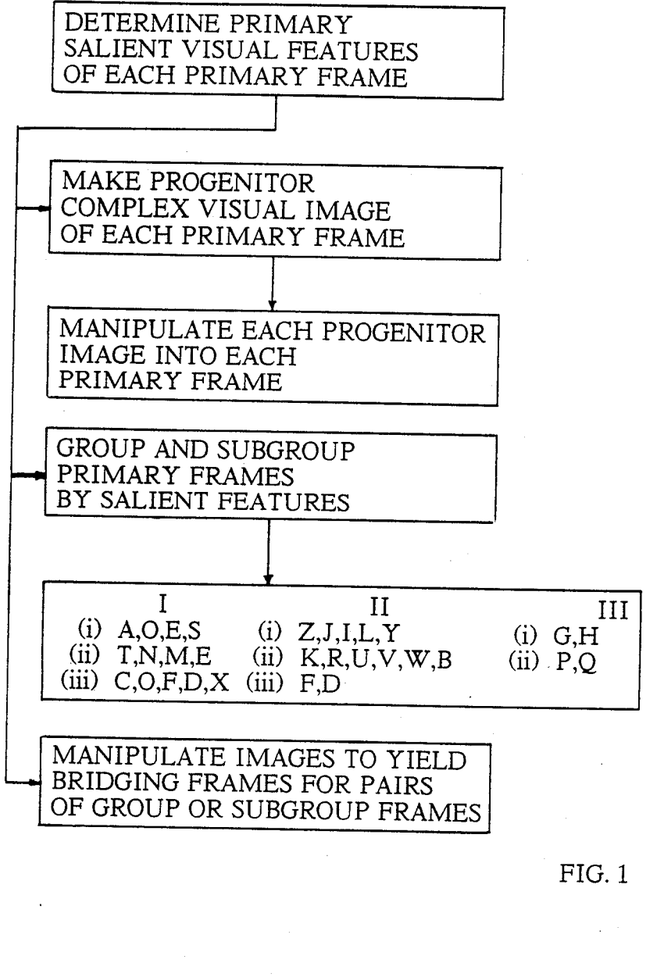
FIG. 1 is a block diagram illustrating the sequence of steps utilized by the present invention to organize the material, here shown as the Manual Alphabet, into groups having common salient features.

There are three main groups of letters: the closed hand, the extended fingers, and the rotated hand.

The grouping of the letters of the manual alphabet can be summarized as follows:

I. Closed Hand Group. On an erect wrist, the hand is in a loose fist. The index (always) and some other fingers are curled. Note that letters with two salient features will be found in both respective subgroups.

(i) A, O, E, S,—Thumb around other fingers.

(ii) T, N, M, E,—Thumb under other fingers.

(iii) C, O, F, D, X,—Thumb forms a circular space with other fingers.

II. Extended Finger Group. On an erect wrist, some of the fingers are extended.

(i) Z, J, I, L, Y,—Outer fingers extended: (a) little finger; (b) thumb; (c) index, only if middle and ring fingers are curled.

(ii) K, R, U, V, W, B,—Inner fingers extended: (a) middle; (b) ring or fourth finger; (c) index, when extended in conjunction with either or both of other two.

(iii) F, D,—Some fingers extended with thumb forming a circular space.

III Rotated Wrist Group. On a wrist bent laterally or forwardly.

(i) G, H,—Wrist bent laterally.

(ii) P, Q,—Wrist bent forwardly.

In the case of finger spelling, the understanding of the letters as three dimensional is optimally tied to understanding them as elements in motion. Therefore, the salient features should emphasize both 3D and motion.

The order of presentation of the letters to the learner can be considered the cognitive content on which the decisions about the salient features of the principal frames can be based. On the basis of visual features, each letter must be capable of preceding or succeeding any other letter of the manual alphabet to simulate the formation of words and phrases.

(Step 5) Balance the information requirements of the visual bridges with their role in providing the illusion of movement to determine their salient features.

In determining the information content of the visual bridges, the following considerations must be made:

(i) Is the starting frame a part of a larger group?

(ii) Is the frame which is to follow the preceding frame a part of the same group?

If the bridging position, i.e. frame, is between two different groups, then the most important of the salient features is that feature which will presage a change in groups. After that consideration, the next most important salient feature is that which distinguishes members of the group.

The illusion of movement is determined not only by salient visual features but by the number of frames and their timing. The respective machines which deliver the frames and the machines/programs which access the principal frames and the visual bridge intermediate frames set parameters for the number of bridges which the system will accomodate. Note that in some other application, if the nature of the movement in real time is more critical than it is in finger spelling, then the real time illusion may be the most important factor, all things considered.

In the case of finger spelling: The visual bridges must presage the group to which the forthcoming letter belongs, i.e.: closed hand, extended fingers, or rotated hand. Whether the bridging frames can presage the exact member of the next group or a limited subset of the next group may depend on the constraints of the delivery system.

As an example of the constraints of a delivery system consider the problem of accessing images. Each letter of the manual alphabet precedes or succeeds another letter. The computer program must be able to distinguish the bridge to the letter A that comes from the letter B, from the bridge to the letter A that comes from the letter C. If each of these bridges is different, then the access speed or the memory capacity of the computer may not be able to deliver and display a defined sequence of individual letters with the speed needed for them to be perceived as the intended word.

Because the storage of complex images would be very memory intensive if they were stored in a computer, they are usually stored in a videodisc, a compact disc, or similar peripheral device. The speed of access to these images must be fast enough to provide the illusion that the images are immediately successive, with no blanking or flashing of color to interfere with the observer's persistence of vision. Although retrieved in its entirety substantially instantaneously, each image must be capable of being observed for preselected different durations of time.

On the other hand there are cognitive considerations which may influence the choice of bridging positions. Some bridging positions can serve only between one group and another group. Others can serve between one subgroup and another subgroup in the same group.

Some bridging positions will presage a particular letter. E.g., an intermediate position which is unique to a single combination of letters, i.e., K to P, or P to K, is a wrist bent forwardly with the index and the middle fingers extended and the thumb on the joint of tho middle finger. See FIGS. 11, 12, 13, and 14.

If a letter is to be repeated, i.e., doubled, then the bridging position may merely be a slight opening and closing of the fingers. That can be a unique bridging position for each letter in the case that the delivery systems can accomodate a large number of bridging positions.

Figure 2:
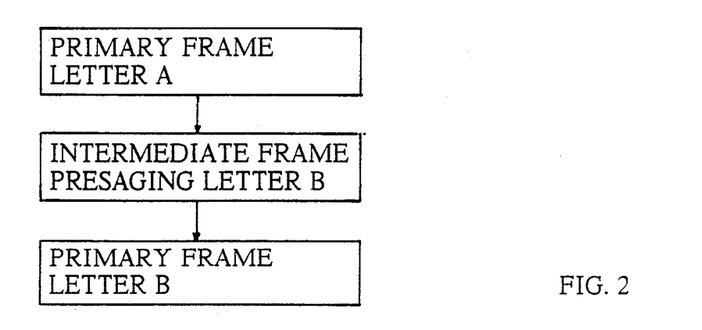
FIG. 2 is a block diagram of an exemplary motion sequence, here shown as a preceding frame showing the letter A, the intermediate frame presaging the letter B, and the suceeding frame showing the letter B.
Figure 3:
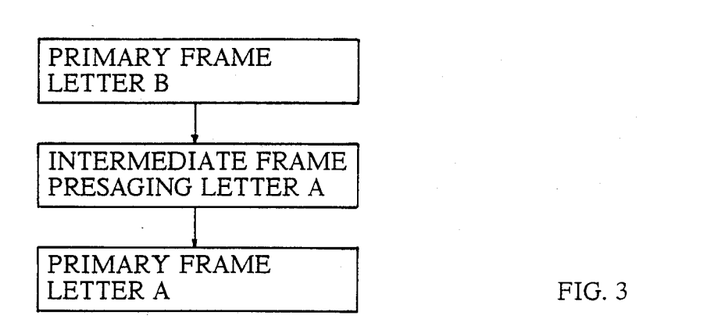
FIG. 3 is a block diagram of another motion sequence, here shown as a preceding frame showing the letter B, the intermediate frame presaging the letter A, and the suceeding frame showing the letter A.
Figure 4:
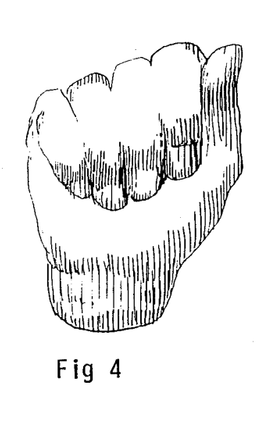
FIG. 4 is a frame showing the letter A.
Figure 5:
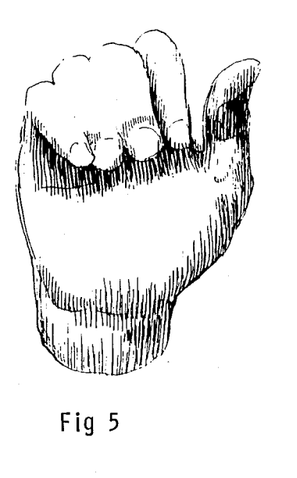
FIG. 5 is a frame showing a bridge between the letters A and B.
Figure 6:
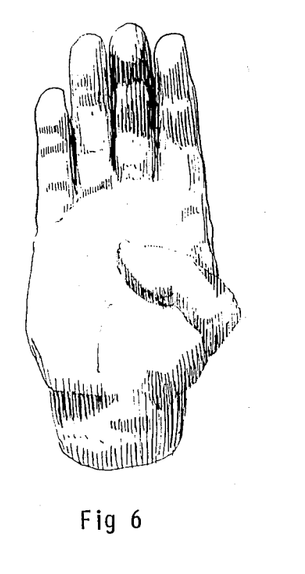
FIG. 6 is a frame showing the letter B.
Figure 7:
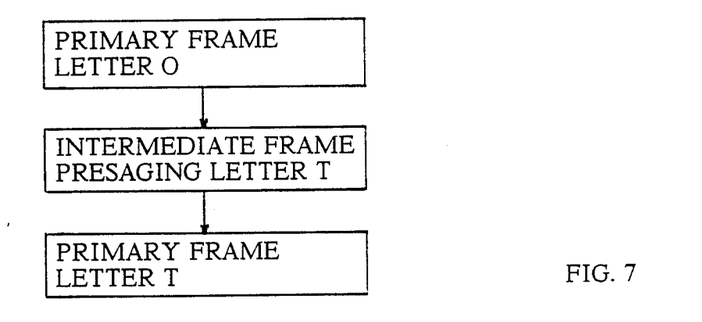
FIG. 7 is a block diagram of yet another exemplary motion sequence, here shown as a preceding frame showing the letter O, the intermediate frame presaging the letter T, and the suceeding frame showing the letter T.
Figure 8:
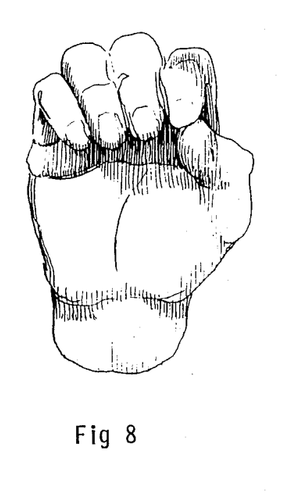
FIG. 8 is a frame showing the letter O.
Figure 9:
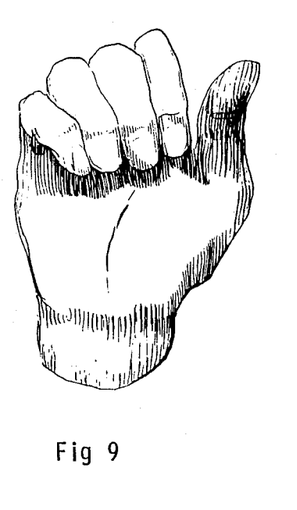
FIG. 9 is a frame showing a bridge between the letters O and T and is identical to FIG. 5.
Figure 10:
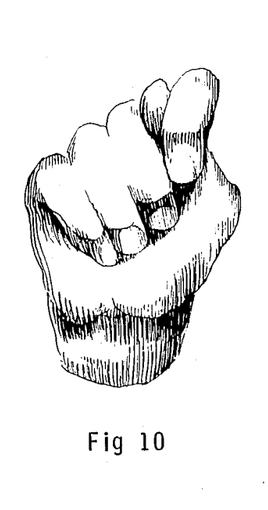
FIG. 10 is a frame showing the letter T.
Figure 11:
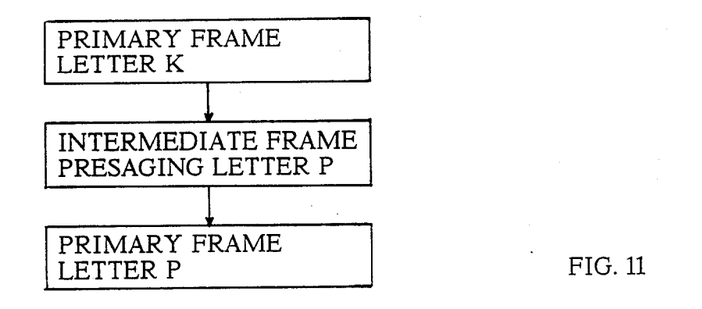
FIG. 11 is a block diagram of yet another exemplary motion sequence, here shown as a preceding frame showing the letter K, the intermediate frame presaging the letter P, and the suceeding frame showing the letter P.
Figure 12:
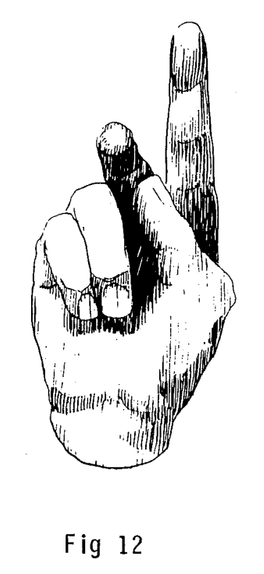
FIG. 12 is a frame showing the letter K.
Figure 13:
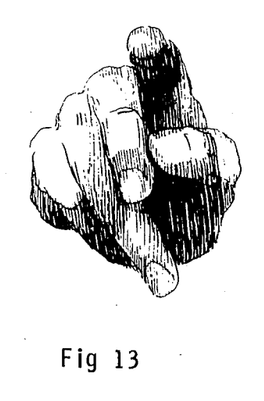
FIG. 13 is a frame showing a bridge between the letters K and P.
Figure 14:
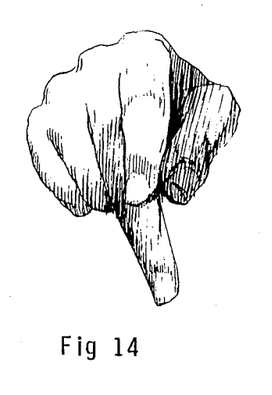
FIG. 14 is a frame showing the letter P.

An example of a bridging position which can be used to reduce the number of needed bridges is an intermediate position which may be called an "open A", having the salient characteristics of an erect wrist, loosely curled fingers, and a slightly separate extending and erect thumb. The "open A", as shown in FIGS. 5 and 9, can serve as a visual bridge between a principal frame image of the manual alphabet letter A of subgroup I(i), see FIG.4, and a suceeding principal frame with a visual image of either letter O of subgroup I(iii), see FIG. 8, or, alternatively, the letter I of subgroup I(ii), see FIG. 10, or, alternatively, letter B of subgroup II(ii), FIG. 6, or, for a preceding frame with either letter O or letter T or letter B to a suceeding frame with the letter A. See FIGS. 2 and 3. This does not exhaust the letters for which the open A can be bridge.

In general, the more specific the need to presage a particular frame, the more salient features that must be in one bridging frame or the more bridging frames, each with fewer salient features, that are needed.

Because bridging frames serve to provide an illusion of motion, their salient features which must contribute to that illusion may differ from the salient features of the principal frames. Surface information, which enhances the information in a still principal frame, such as a shadow, may be irrelevant when moving. Surface information, such as texture, which may be irrelevant in a still frame, may prove distracting in a bridging frame or may enhance the perception of movement.

In the case of bridges between letters of the manual alphabet, the surface texture of the hand adds to the illusion of movement. It is only slightly less important than the figure/ground contour. The most important determinate of the salient features of the bridging frames is, of course, timing. The relative holding, i.e., durations of time of display, of principal and bridging frames will influence which of the other salient features become critical. The less time a frame is held, the more important it is to identify the critical salient feature.

In the case of principal finger spelling frames, the figure/ground contour will be the most important, especially if the viewer is anticipating one of the three groups. The orientation of the fingers relative to the stationary parts of the hand will be the second most important salient feature. Surface information will be third in importance as a salient feature of the principal finger spelling frames.

(Step 6) Apply the above considerations to further altering the complex images described in steps 2 and 3, and to making bridging frames. In addition to refinements such as enhancing and deleting edges, altering color and shading, etc., it should be noted that bridging frames can be made at the same time and in the same manner as steps 1 and 2, but can also be made from manipulations of either or both principal frames or can be new images made directly on the computer. (Step 7) Prepare the images for the particular delivery system with reference to two main issues: the image storage capabilities and the image access capabilities.

(A) The maximum storage capacity of the image delivery mechanism will determine the maximum number of visual bridges between frames and may require a special placement or ordering of the images for timely access.

(B) The hardware or software parameters of the access mechanism include:

(1) all configurations in which the images will be accessed;

(2) the rules or algorithms by which they will be accessed; and (3) the timing of image presentation.

Flexibility in timing is an important feature of this invention. The ability to display images for preselected different durations of time provides the result that salient cognitive features do not have to be subservient to the salient features which produce the illusion of realistic movement.

Film images have standard presentation times for each frame. Delivered on a sound projector, the standard rate is 24 frames/second. Delivered on a silent film projector, the rate is 18 frames/second. If transferred to videotape, some frames must be repeated to accomodate a delivery rate of 30 frames/second. Every delivery speed has its own characteristics which can be used by one skilled in the art to provide certain effects. Each of these systems, however, delivers each frame at a uniform speed, i.e., displays each frame for a constant duration of time.

Delivery systems such as the computer are theoretically capable of delivering a particular image through extremely long or short time intervals, although a particular system may have practical limitations. Used in conjunction with the fact that the images do not have to be retrieved in the order in which they are input or the same order every time allows for kinds of animation heretofore not possible.

The best embodiment of a delivery system would allow as many inbetween frames as would allow the option of real time motion. It would allow playback of sequences at real time speed and at all other speeds desirable for educational purposes, which might include faster than real time as well as several slower than real time speeds. The best embodiment of a delivery system would allow alternative paths through the material i.e., control over which frame of a visual grouping will be displayed and in what order.

The best embodiment of a delivery system would allow, in a self contained system, ancillary techniques for conveying information such as overlay of text on images, sound track, color or other symbol coding, etc. It would also allow various feedback devices whereby the computer would bring student response into the system, such as: keyboard, voice recognition, motor (anatomical) sensing devices, etc. An example of a motor sensing device in the case of finger spelling is: a glove wired with sensors, so that configurations of the hand within the glove are entered as coordinates in the computer and matched to templates of the correct hand configurations, thereby providing a means for evaluating the correctness of the student's hand configuration in forming each letter. An exemplary glove and circuitry are shown in U.S. Pat. No. 4,414,537, issued to G. J. Grimes on Nov. 8, 1983.

(Step 8) The prior steps are used to produce a system which will allow a user to type words onto a keyboard and to see a visual image display of those words finger spelled out either as the user would see them (receptive) or make them (expressive). Since finger spelling often involves unfamiliar words, a minimal system will also allow the user to see spelled out previously entered word lists or phrases. While this would be a great leap forward in tools available for learning finger spelling, it would not take full advantage of the capabilities of the invention.

This invention allows multiple uses of the same images. It also allows a self contained system for multiple learning strategies. It allows the user to structure the level of participation in available activities and the order in which to participate in them.

The preferred embodiment of this invention incorporates heuristics both visual (innate and learned) and cognitive.

The process of this invention for teaching finger spelling may be layed out in the traditional structured manner, conventionally called "guided learning," with the steps as follows;

First the receptive alphabet is presented to the learner, since reading recognition is the ultimate goal and any advantage of first impressions should be retained. The rotated view of the expressive alphabet should then be presented. This allows a complete view of the positioning of the fingers and emphasizes the concept that this is not a static alphabet, nor two alphabets, but the same alphabet of moving letters.

The letters are presented in visual groups as outlined above. The learner will continue with the expressive alphabet to direct all the heuristics involved in understanding what one's own hand looks like to others to the task of learning finger spelling as one alphabet. The order of presentation embodies a kinesthetic progression: e.g. the thumb is felt to move toward the little finger, as it makes T, N, M, and E. The learner then learns the receptive alphabet in visual groups and learns to identify the salient features within the groups.

It is a feature of this invention that each letter can be accessed rapidly from the expressive and then the receptive modes, simulating a toggle switch. This reinforces the connection between what is felt and what is seen. It also gives practice in anticipating which features are the salient ones when a letter is glimpsed as in motion. A split screen option is also desirable.

Letters are assembled into words by allowing a user to type words onto a keyboard to produce a visual image display of those words, either as the user would see them or make them. Alternatively, the user can see words spelled out from previously entered word lists or phrases spelled out.

Numbers can be treated in a similar manner, although the complete set of alternatives is not necessary because of the similarity of most hand positions to an intuitive indication of numbers generally made by hearing people.

Words and numbers can be assembled into complete finger spelled sentences by increasing the holding time of the last letter of a word, or similar techniques.

Sentences can also combine signs and spelled words. It is possible to animate signs using the same techniques as animating finger spelling, or signs can be played as motion sequences with only an animation of the visual bridge between the first or last frame and the finger spelled sequence.

Practice activities and testing are standard features in structured learning. Games can substitute for either practice or evaluation. It is a feature of this process of teaching finger spelling that structured learning is an option, and is only one option.

The above activities can be done in any order, sometimes called "discovery learning." This allows possible activities not anticipated in the structured approach. For example: the learner is working on sentences but finds he is constantly confusing D and F. He can briefly leave sentences, go to the letter mode and see D or F or both, and thereafter return to sentence practice. The effectiveness of such strategies depends on quick access time to get additional information without losing the sense of engagement in the prior activity.

The preferred embodiment of this method of teaching finger spelling utilizes a program having always available function keys, i.e., keys pre-programmed to perform set tasks, and icons or symbols always visible to remind the user of the available functions. The icons comprise the following:

"Path": puts the program in letter, number, or sentence mode.

"Go": Directions for the segment, dependent on mode selection.

"Letters-Expressive": The a letter, see the letter. Always active.

"Letters-Receptive": Type a letter, see the letter. Always active.

"Numbers": Receptive only or same as letter treatment.

"Practice-Expressive": Activities, dependent on mode selection.

"Practice-Receptive": Activities, dependent on mode selection.

"Games": Dependent on mode selection.

"Compass": The location in the program of the activity of the user. What ideally should have been completed, suggestions for what to next. Dependent on mode selection.

"Help": How to use the keys. Always active in all modes.

"Space Bar": Next activity in structured environment.

"Escape key": Leave program.

The entire program for access and display, including the function keys illustrated by the icons, can be generated by the use of a conventional video disc authoring system: such as "IMSATT-2000," provided by Imsatt Corporation, presently of Falls Church, Virginia, and which includes an expert system shell, voice recognition and generation, text and graphic overlays, and sound over still frame. Such a system, however, is only successful in complex branching situations when provided with the limited number of multipurpose bridging frames taught by this invention. Otherwise, the very large duration of time, required for access to the very large number of bridging frames which by conventional thinking would be indicated by all of the possible combinations of all of the letters of the alphabet, would fail to provide the illusion of motion. The minimum equipment required to practice this invention is: a conventional video disc player with instant access to a subset of all stored frames, e.g., "Pioneer LD-V6000" series, a conventional personal computer with adequate RAM and a floppy disc drive, and the executable file generated by the authoring system.

It is a feature of this program that it anticipates that an adult learner may tend to skip steps and get stuck in the program. That is why it features three kinds of help: technical, how-to-use-the-computer help; directions for the next step in structured learning; and compass type help, how to get one's bearings. It is this last kind of help which is unique. The animation techniques described in this invention open the possibility to learning strategies that have largely been ignored in the past. An example is the person who heads right for games, plays happily and successfully but finally hits a plateau. This method of learning is called discovery learning. The discovery learner is the despair everywhere of writers of manuals of instruction and the darling of writers of treastises on fostering the creative learner. The herein described techniques at last provide structured help to the discovery learner.

What is claimed is:

1. A process of animation of subject matter for use in a mechanism having means for individually storing, accessing and displaying frames of visual elements, comprising:
    (a) determining the primary salient visual features, including surface information, which are to be contained as visual elements of the principal frames of the subject matter;
    (b) making a complex visual image as a progenitor of each respective principal frame; and
    (c) manipulating each respective complex visual image to emphasize the determined respective primary salient visual features, including surface information, so as to yield said respective desired visual elements, including surface information, in the principal frames.

2. A process according to claim 1, wherein:
    the primary feature emphasized by said manipulation is the distinction between figure, i.e., what is important, and ground, i.e., what is not important.

3. A process according to claim 2, wherein:
    an additional feature emphasized by said manipulation is selected from the surface information group including: texture, color, shading and stereo.

4. A process according to claim 1, further including:
    prioritizing one or more of the group of the salient features which comprise those visual characteristics which act as triggers to the recognition of motion, 3D, and subject matter possessed by the principal frames and grouping the principal frames according to their respectively possessed said prioritized salient features.

5. A process according to claim 4, further including:
    manipulating a complex visual image to provide a visual bridging frame for display after a principal frame and before a principal frame which is subsequent to the first mentioned principal frame;
    wherein said first mentioned principal frame contains a first quantity of salient features, including surface information, and is displayed for a first period of time, wherein said subsequent principal frame contains a second quantity of salient features, including surface information, and is displayed for a second period of time, such that the display in sequence of said first mentioned principal frame, said bridging frame, and said subsequent principal frame provides to an observer continuity of said surface information and an illusion of motion in the displayed sequence of frames.

6. A process according to claim 5, wherein:
said visual bridging frame is one of a plurality of such visual bridging frames and selected features are distributed among said plurality of such visual bridging frames.

7. A process according to claim 5, wherein:
the complex visual image which is manipulated to provide the bridging frame may be taken from any of the group including:
the visual elements of the principal frames,
the original complex visual images,
additional complex visual images, and
a computer fabrication.

8. A process according to claim 5, wherein:
the salient features of the bridging frame are selected so that the bridging frame presages to the observer the salient features of the subsequent principal frame.

9. A process according to claim 8, wherein:
said visual bridging frame is one of a plurality of such visual bridging frames and said selected salient features are distributed among said plurality of such visual bridging frames.

10. A process according to claim 5, wherein:
each bridging frame is displayed for a period of time which is shorter than the periods of display for the preceding principal frame and the subsequent principal frame.

11. A process according to claim 5, wherein: each principal and bridging frame may be displayed for a different respective period of time.

12. A process according to claim 5, wherein:
selected bridging frames may be reaccessed and displayed after any one of a group of different preceding frames and before any one of a group of different subsequent frames.

13. A process for the teaching of finger spelling utilizing the manual alphabet, comprising:
(a) determining the primary salient visual features which are to be contained as visual elements of principal frames respectively representing the letters of the manual alphabet;
(b) making a complex visual image as a progenitor of each principal frame of the respective letters;
(c) manipulating each complex image to emphasize the determined primary salient visual features to yield the respective desired visual elements of the respective letter;
(d) dividing the principal frames of the respective letters into groups and subgroups according to their common respective salient features;
(e) determining the primary salient visual features in common of a plurality of pairs of groups and subgroups; and
(f) manipulating an image to provide at least one bridging frame containing selected salient features of the principal frames of said pair, such that the display in sequence of the principal frames of said pair, interposed by the bridging frame, provides an illusion of motion to an observer in the displayed sequence of frames.

14. A process according to claim 13, wherein:
the salient features of the bridging frame are selected so that the bridging frame presages to the observer the salient features of the principal frame of the suceeding letter of the pair of letters.

15. A process according to claim 14, wherein the letters are grouped as follows:
 I. Closed Hand Group
   (1) A, O, E, S,
   (2) T, N, M, E,
   (3) C, O, F, D, X;
 II. Extended Finger Group
   (1) Z, J, I, L, Y,
   (2) K, R, U, V, W, D,
   (3) F, D;
 III. Rotated Wrist Group
   (1) G, H,
   (2) P, Q.

16. A mechanism for the teaching of finger spelling utilizing the manual alphabet, comprising
a system having means for storing accessing and displaying frames of visual elements;
a plurality of stored principal frames, each respectively containing visual elements of a letter of the manual alphabet;
a plurality of stored intermediate frames, each respectively containing visual elements having salient characteristics related to the salient characteristics of the visual elements of two letters of the manual alphabet;
said system means accessing and displaying a selected sequence of a principal frame of a selected first letter, a selected intermediate frame, and a principal frame of a selected second letter, to provide an illusion of motion to an observer in the displayed sequence of frames.

17. A mechanism according to claim 16, wherein:
said means for accessing has random access to each frame.

18. A mechanism according to claim 16, wherein:
said means for displaying has variable durations of time of display of each frame.

19. A mechanism according to claim 17, wherein:
certain of said principal frames contain the letters of the manual alphabet shown in the expressive mode and others in the receptive mode; and
said means for accessing and displaying alternatively and sequentially displays a selected letter in the expressive and receptive modes.

20. A process of animation of subject matter for use in a mechanism having means for individually storing, accessing and displaying frames of visual elements, comprising:
displaying each frame in a sequence of said frames for any respective one of a plurality of different preselected durations of time, so as to provide to an observer an illusion of motion in said displayed sequence of frames and utilizing fewer frames than would be necessary in real time if each of said displayed frames were displayed for a uniform duration of time.

21. A process according to claim 20, wherein:
certain of said frames are principal frames;
certain of said frames are bridging frames; and the duration of display of a bridging frame is shorter than the durations of display of the respective preceding and suceeding principal frames.

22. A process according to claim 20, wherein:
said frames contain 3D information including surface information.

23. A process of animation of subject matter for use in a mechanism having means for individually storing, accessing and displaying frames of visual elements:
  (a) determining the primary salient visual features which are to be contained as visual elements of a plurality of principal frames of the subject matter;
  (b) prioritizing the salient features possessed by the principal frames and arranging the principal frames into groups based on their respectively possessed said prioritized salient features;
  (c) providing a plurality of bridging frames, each containing selected salient features of both a principal frame which is to follow the first mentioned principal frame, such that the display in sequence of the first mentioned principal frame, the bridging frame, and the following principal frame provide an illusion of motion to an observer in the displayed sequence of frames, and selected bridging frames may be accessed and displayed after any one of a group of different preceding frames and before any one of a group of different suceeding frames.

24. A process according to claim 23, wherein:
the salient features of each bridging frame are selected so that such bridging frame presages to the observer the salient features of the respective suceeding frames.

25. A process according to claim 24, wherein:
said frames contain 3D information including surface information.

26. A process of animation of subject matter for use in a mechanism having means for individually storing, accessing and displaying frames of visual elements, comprising:
storing a plurality of principal frames, each containing respective visual elements;
storing a plurality of bridging frames, each containing respective visual elements;
initially accessing and displaying a first selected principal frame for a first period of time;
thereafter accessing and displaying a selected bridging frame for a second period of time;
yet thereafter accessing and displaying a second principal frame for a third period of time;
wherein said first period of time differs in duration from said second period of time, and the display in sequence of said first principal frame, said bridging frame, and said second principal frame provides to an observer an illusion of motion in the displayed sequence of frames.

27. A process according to claim 26, wherein:
said selected bridging frame is one of a selected plurality of bridging frames which are respectively sequentially accessed and displayed after said first selected principal frame and before said second selected principal frame.

28. A process according to claim 27, wherein:
each bridging frame is displayed for a period of time which is shorter than the periods of display for the preceding first principal frame and the subsequent second principal frame.

29. A process according to claim 26, wherein:
selected bridging frames are reaccessed and displayed after any one of a group of different preceding principal frames and before any one of a group of different subsequent principal frames.

* * * * *